United States Patent [19]
Faircloth, Jr.

[11] Patent Number: 5,884,580
[45] Date of Patent: Mar. 23, 1999

[54] PET FOOD AND WATER CARRIER

[76] Inventor: J. Wade Faircloth, Jr., 119 Hatcher Dr., Newport, N.C. 28570

[21] Appl. No.: 816,116

[22] Filed: Mar. 11, 1997

[51] Int. Cl.[6] ...................................................... A01K 1/10
[52] U.S. Cl. ...................... 119/51.5; 220/23.4; 220/23.8; 119/61
[58] Field of Search ................... 220/23.4, 23.8, 220/23.83, 553, 555; 119/51.5, 72, 61; 206/217, 541, 546, 547

[56]         References Cited

U.S. PATENT DOCUMENTS

| | | | |
|---|---|---|---|
| 364,567 | 6/1887 | Baron | 206/541 |
| 918,115 | 4/1909 | Baeder | 206/541 |
| 1,809,596 | 6/1931 | Nason | 206/546 |
| 1,976,622 | 10/1934 | McIntyre | 220/23.4 |
| 2,738,893 | 3/1956 | Quinones, Jr. | 220/23.4 |
| 2,833,436 | 5/1958 | Ruderian | 206/217 |
| 3,152,576 | 10/1964 | Faurot . | |
| 4,192,256 | 3/1980 | Clugston . | |
| 4,548,339 | 10/1985 | Gorman | 220/555 |
| 5,016,572 | 5/1991 | Weber . | |
| 5,056,424 | 10/1991 | Lai | 206/546 |
| 5,125,363 | 6/1992 | McGaha . | |
| 5,458,087 | 10/1995 | Prior . | |
| 5,560,315 | 10/1996 | Lampe . | |

FOREIGN PATENT DOCUMENTS

| | | | |
|---|---|---|---|
| 3741350 | 6/1989 | Germany | 220/23.4 |
| 2267212 | 12/1993 | United Kingdom | 206/217 |

*Primary Examiner*—Todd E. Manahan
*Assistant Examiner*—Eduardo C. Robert
*Attorney, Agent, or Firm*—Rhodes, Coats & Bennett, L.L.P.

[57]         ABSTRACT

A multi-compartmented, transportable pet food and water carrier that includes food and water supply containers with opposed access openings, and a common wall; and food and water dishes removably attached over the access openings. The dishes have side walls with attachment means extending therefrom, so that the dishes can be attached in a side-by-side configuration for stability during use, the attachment means extending downwardly from the carrier when the dishes are attached to form support feet for the carrier. A carrying handle is attached to the upper side of the carrier.

8 Claims, 2 Drawing Sheets

PET FOOD AND WATER CARRIER

BACKGROUND OF THE INVENTION

(1) Field of the Invention

The present invention relates generally to a carrier for transporting food and water for an animal, and in particular to a multi-compartmented carrier that includes dishes or bowls for feeding and watering the pet without contamination of the food and water supply.

(2) Description of the Prior Art

When traveling with a pet, such as a dog, it is often necessary to carry both pet food and water in the event that the pet requires feeding or watering at a time and place where food or water is not otherwise conveniently available. In order to address this need, it is necessary to provide a container for the food; a container for the water; and a means, such as feeding dishes, for serving the food and water to the pet.

Traveling with all of these items can be cumbersome, bulky and inconvenient. Thus, attempts have been made in the prior art to design a carrier that can be used to store food and/or water within separate compartments in a single unit. Certain of these designs have also included some provision for serving dishes to feed or water the pet.

U.S. Pat. No. 4,192,256 to Clugston, for example, describes a carrier used as a combination feeder and waterer for pets. The carrier includes an inner compartment for holding water. A depression in the top of the carrier serves as a food dish. A water dish is attached to the side of the carrier, with a spout extending from the water compartment into the water dish, so that water can enter the dish from the compartment. There is no provision for carrying multiple servings of food or controlling the amount of food or water consumed.

U.S. Pat. No. 5,458,087 to Prior et al describes a container used to carry food and water for pets. No provision is made for separate feeding dishes. Therefore, the pet eats or drinks directly from the storage compartments of the container. As a result, the pet has access to all of the food and water in the container, resulting in uncontrolled consumption and in contamination of the unconsumed food and water.

U.S. Pat. No. 5,560,315 to Lampe also describes a carrier for holding food and water for a pet. The carrier is essentially a small water dish positioned inside a larger food dish, with a lid on each dish. Since the small dish is inside the larger dish, ants are kept out of the water. Again, the pet has access to all of the contents.

U.S. Pat. No. 5,125,363 to McGaha describes a container similar to the Lampe container, in that a water container is positioned inside of a larger food container. The containers may be used both for transportation and feeding. Again, the pet has access to all of the food and water.

Carriers described in the prior art fail to meet all of the requirements for a suitable carrier for pet food and water. These requirements are 1) a configuration whereby all components can be easily carried as a single unit, 2) separate food and water compartments, preferably holding multiple servings of food and water; and 3) food and water serving dishes independent of the storage compartments, so that the pet can be served a defined portion of the food or water without contaminating the remainder of the food or water. Desirably, the serving dishes should be designed for stability when being used, since the food and water will often be served together. Also, the compartments should be provided with large access openings for easy cleaning, and the access openings should be protected as much as possible.

SUMMARY OF THE INVENTION

The present invention relates to a carrier for pet food and water comprised of separate compartments for food and water, and detachable food and water dishes. More specifically, the carrier is comprised of a food container having a continuous outer wall with an access opening into the interior of the food container; a water container having a continuous outer wall with an access opening into the interior of the compartment; removable closures over the access openings in the food and water containers; and food and water dishes removably attached to the food and water containers. The carrier may also include a carrying handle attached to at least one container, and feet to support the carrier on a surface, such as the ground.

The exact configuration of the food and water containers is not a critical feature of the invention, and the containers may be of different shapes or capacities. For economy of manufacture, however, the containers should have the identical configuration, so that they can be manufactured with the same mold. The continuous wall defining the container interior may be described as being formed of a plurality of segments, e.g., side segments, a bottom segment and a top segment, with all of the segments having integral edges to form the continuous wall.

Each container will have an access opening for use in filling the container with food or water, and removing the food or water therefrom. These access openings will be covered with a removable lid or closure to prevent spillage of the container's contents during transportation. The access openings should also be of a size permitting easy cleaning of the interior of the containers after use. While it is not essential for the access openings to be of the same size, it is desirable for economy of manufacture. The closures can be of a size corresponding to the access openings. The closure for the water supply compartment can include a pouring spout. Preferably, the access openings are angled upwardly at an angle of less than 90° from horizontal, e.g., from about 30° to 60°, so that spillage of the food or water will be minimized.

In order to form a single unit, the food and water containers are joined at a wall segment. This joinder can be achieved in a variety of ways familiar to one skilled in the art. For example, abutting wall segments of the two containers can be joined to each other, e.g., by gluing or ultrasonic welding. Alternatively, the containers can be molded together with a common wall segment being shared by the two containers. Another way to join the wall segments is to provide a mounting plate that is positioned between the wall segments, with facing wall segments being joined to opposite sides of the mounting plate.

The particular wall segments to be joined will depend upon the desired design of the carrier. Preferably, however, the wall segment of each container that are on the opposite side of the container from the container's access opening will be joined to each other, permitting the food and water to be dispensed from opposite ends of the carrier.

The food and water serving dishes may also be on different shapes or dimensions. Again, however, it is desirable for the dishes to be of the same configuration, so that a single mold can be used to produce both dishes. Each dish will be formed of a continuous wall having side segments and a bottom segment. The continuous wall form a dish cavity for holding the food or water. The cavity is preferably shaped to nest over at least a part of a food or water compartment, and preferably over the access opening of the food or water compartment.

The carrier may also include a carrying handle that is attached to at least one of the containers. Preferably, the handle is secured to the upper surfaces of both containers. For example, the handle can include a central grip section between a first end attached to the wall of the food container and a second end attached to the wall of the water container. The handle may be attached to the container in various ways, e.g., by gluing or ultrasonic welding. Alternatively, the handle can be integrally molded with the containers. The handle can also form a part of the aforementioned container mounting plate.

The carrier may also include feet to support the carrier when the carrier is resting on the ground or other surface. These feet may extend outwardly from the lower surfaces of the serving dish walls, and opposite the carrier handle, when the dishes are attached to the containers. As will be described in the preferred embodiment, these feet may also be used to releasibly attach the dishes to each other when the dishes are being used to serve food and water. When used for this purpose, the feet of each dish are configured to join or engage the feet of the other dish.

In order for the dishes to be made with a single mold, the feet may be identical on each dish, but designed so that they are releasibly engageable when facing toward each other. Each dish can include one foot having a male configuration, and a second foot having a corresponding female configuration, with the male foot of each dish being adapted to releasibly engage the female foot of the other dish when the dishes are placed with the dish sides supporting the feet facing each other. Thus, the dished can be joined together by the feet to form a single unit, providing greater stability and reduced spillage during feeding and watering.

It should be understood, however, that the exact design of the feet is not critical to the invention, and that other designs will be apparent to one skilled in the art. For example, each dish can include a single elongated foot extending across the bowl. The shapes of these feet, while identical, can be designed to releasibly join each other when the feet are facing toward each other.

The carrier and the various parts thereof can be formed of a variety of materials. However, the carrier is preferably formed for the most part from plastic. As discussed herein, the components can be formed or molded individually or multiple components can be formed as a single integral piece.

Thus, it is an aspect of the invention to provide a pet food and water carrier comprised of a food holding container with an access opening; a water holding container with an access opening; a removable first serving dish secured over a part of the food holding container; and a removable second serving dish secured over a part of the water holding container. The carrier may further include a carrying handle attached to at least one of the containers. The serving dishes may also include attachment means to secure the dishes to each other.

It is another aspect of the invention to provide a pet food and water carrier comprised of food and water containers, each having a continuous wall and an access opening, with the containers being joined to each other; and first and second serving dishes secured over the access openings of the food and water containers.

Yet another aspect of the invention to provide a pet food and water carrier comprised of a food holding container having a continuous wall with an access opening, and a removable closure covering the access opening; a water holding container having a continuous wall with an access opening, and a removable closure covering the access opening, the food and water holding containers being joined to each other; a removable food serving dish secured over the closure of the food holding container; a removable water serving dish secured over the closure of the water holding container; and a carrying handle to at least one of the containers.

It is still another aspect of the invention to provide a pet food and water carrier comprised of a food compartment, a water compartment; and releasably secured first and second serving dishes, each dish including projections serving as feet when the dishes are releasably secured, and as attachment means to secure the first and second dishes to each other when the dishes are removed from the carrier.

Another aspect of the invention to provide a transportable carrier for pet food and water comprising a food supply compartment with an access opening having a removable cover; a water supply compartment with an access opening having a removable cover, the food and water supply compartments sharing a common wall segment; a food serving dish detachably secured over the access opening of the food supply compartment, the food serving dish including a side wall with first attachment means extending outwardly therefrom; a water serving dish detachably secured over the access opening of the water supply compartment, the water serving dish including a side wall with second attachment means extending outwardly therefrom, the first and second attachment means being joinable to secure the food and water dishes in a side-by-side arrangement for serving; and a carrying handle attached to at least one of said compartments.

These and other aspects of the invention will become apparent to one skilled in the art upon reading the following Detailed Description of the Invention, taken with the drawings.

DETAILED DESCRIPTION OF THE INVENTION

In the following description, terms such as horizontal, upright, vertical, above, below, beneath, and the like, are used solely for the purpose of clarity in illustrating the invention, and should not be taken as words of limitation.

Figure 1:
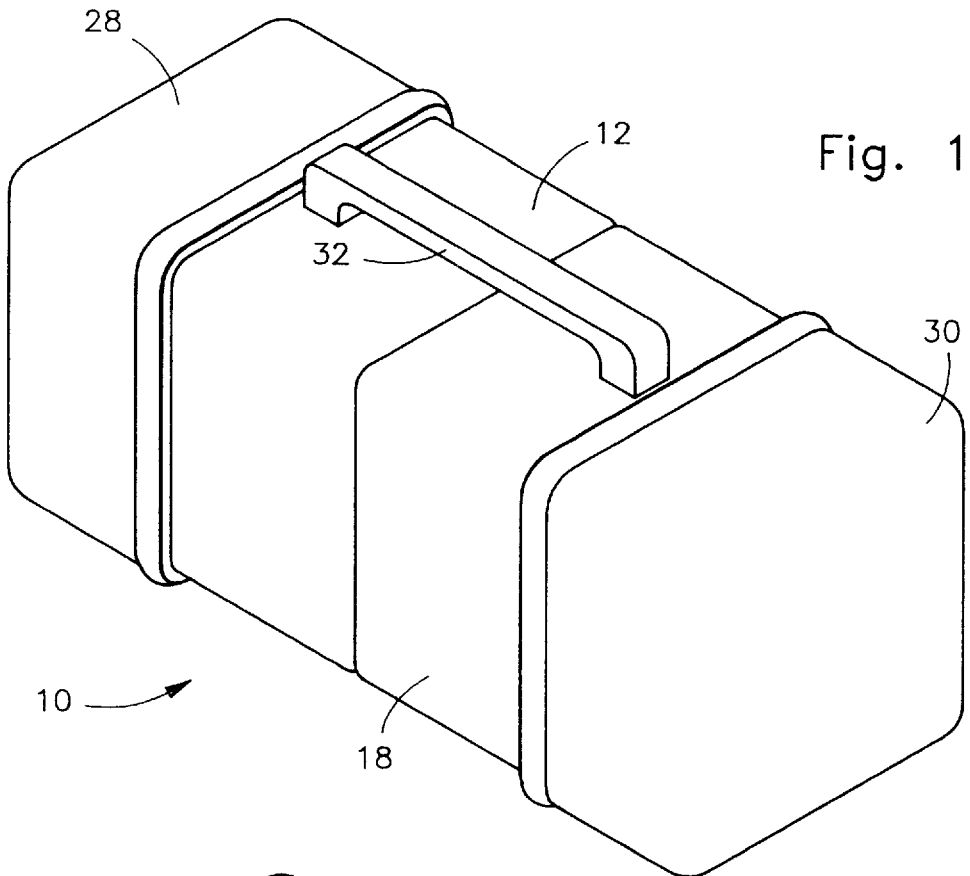
FIG. 1 is a perspective view of the carrier as seen from the top with the serving dishes releasibly secured to the food and water containers.
Figure 2:
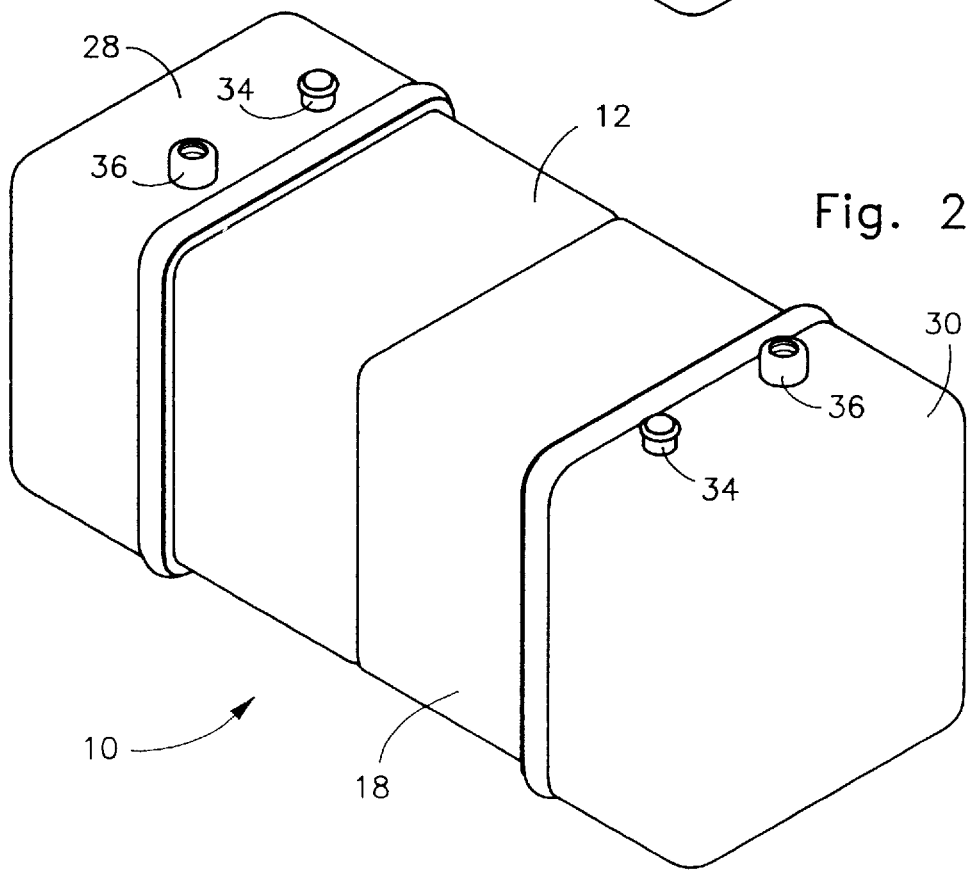
FIG. 2 is a perspective view of the carrier as seen from the bottom, illustrating placement of the feet.
Figure 3:
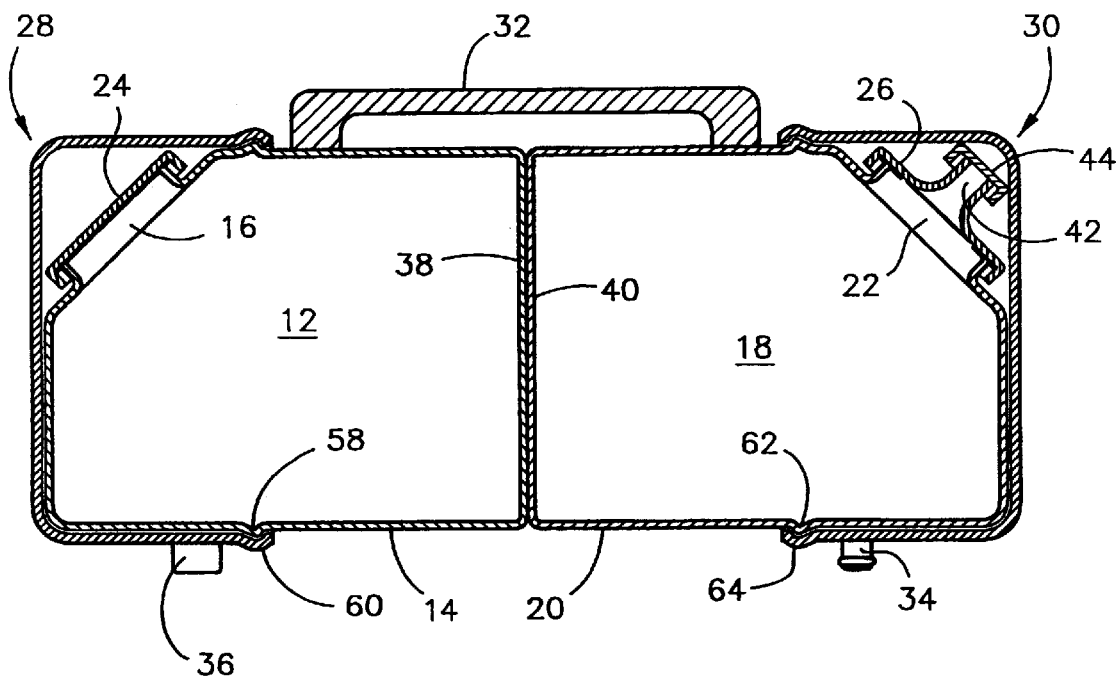
FIG. 3 is a sectional side view of the carrier.

As best shown in FIGS. 1–3, carrier, generally 10, is comprised of a food container 12 having a continuous wall 14 with an access opening 16 into the container cavity; a water container 18 having a continuous wall 20 with an access opening 22 into the container cavity; a removable closure 24 over access opening 16; a removable closure 26 over access opening 22; a food dish 28 removably attached to the food container 12; a water dish 30 removably attached to the water container 18; a carrying handle 32; male feet 34; and female feet 36.

Containers 12 and 18 are of the identical configuration and are attached at wall segments 38 and 40, respectively. Access openings 16 and 22, which are of the same shape and size, are located at opposite ends of carrier 10, and are positioned at an angle of about 45° form horizontal, to minimize spillage of food or water prior to dispensing. Closure 24 covering access opening 16 is an impervious cap, while closure 26 covering access opening 22 includes a spout 42, covered at its end with a removable cap 44.

Food dish 28 and water dish 30 are also of the same configuration, so that a single mold can be used to produce both dishes. Dish 28 is formed of a continuous side wall 46 and a bottom wall 48, together forming a food holding cavity or depression 50. Similarly, dish 30 is formed of a continuous side wall 52 and a bottom wall 54, together forming a water holding cavity or depression 56. Cavities 50 and 56 have an inner shape corresponding to the exterior shape of parts of the exterior of containers 12 and 18, respectively, so that dish 28 can be snugly nested over a part of container 12 when releasibly attached, and dish 30 can be snugly nested over a part of container 18.

Figure 4:
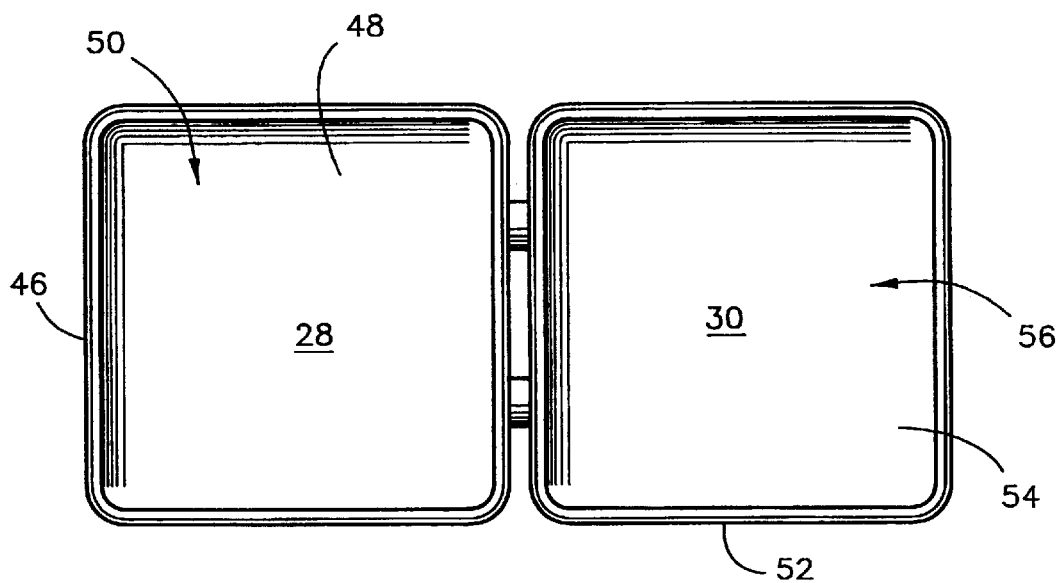
FIG. 4 is a top view of the serving dishes joined to each other.

As best shown in FIG. 4, dishes 28 and 30 each have a male foot 34 and a female foot 36 extending horizontally outwardly from side walls 46 and 52, respectively. Feet 34 and 36 are in the same position on each dish, so that, when dishes 28 and 30 are positioned with the feet of the respective dishes facing each other, each male foot 34 will be insertable into a female foot 36. Thus, feet 34 and 36 serve two purposes. When dishes 28 and 30 are releasably supported on containers 12 and 18, feet 34 and 36 are positioned at the bottom of carrier 10 to support carrier 10. When used, dishes 28 and 30 are rigidly held together by connecting male feet 34 to female feet 36 to provide stability.

When carrier 10 is to be used, container 12 is filled with a supply of food, which may be in various forms, including dry, or even canned, and access opening 16 is covered with closure 24. Container 18 is filled with water and access opening 22 is covered with closure 26. Dish 28 is nested over the outer end of container 12 and snap-fitted in place with continuous projection 58 on container 12 fitting into continuous depression 60 on the interior of dish 28. Similarly, dish 30 is nested over the outer end of container 18 and snap-fitted in place with continuous projection 62 on container 18 fitting into continuous depression 64 on the interior of dish 30. Carrier 10 can then be transported as a single unit, and can be carried by handle 32.

When the pet is to be fed and watered, dishes 28 and 30 are detached from containers 12 and 18, respectively. Male feet 34 on each dish is inserted into female feet 36 on the other dish to form stable, joined dishes, which are placed on a surface where the pet is to be fed. Dish 28 is filled with the desired amount of food from container 12, and dish 30 is filled with the desired amount of water from container 18, the water being poured into dish 30 through spout 42.

Certain modifications and improvements will occur to those skilled in the art upon a reading of the foregoing description. By way of example, container 28 and 30 have a cylindrical cross section, instead of the square cross section shown in the preferred embodiment. Also, the feet can be of various designs, so long as the feet on one dish can be attached to the feet on the other dish. In addition, access openings can be positioned at the side of the carrier, instead of at opposite ends. It should be understood that all such modifications and improvements have been deleted herein for the sake of conciseness and readability but are properly within the scope of the follow claims.

What is claimed is:

1. A transportable carrier for pet food and water comprising:

a) a food supply container with an access opening, said access opening having a removable cover;

b) a water supply container with an access opening, said access opening having a removable cover, said food supply container and said water supply container being joined to each other;

c) a food serving dish detachably secured over the access opening of said food supply container, said dish including a side wall with first attachment means extending outwardly therefrom, said first attachment means projecting downwardly when said food serving dish is secured over said food supply container; and d) a water serving dish detachably secured over the access opening of said water supply compartment, said water serving dish including a side wall with second attachment means extending outwardly therefrom, said second attachment means projecting downwardly when said water serving dish is secured over said water supply container, said first and second attachment means being joinable to each other to hold said food and water dishes in a side-by-side arrangement.

2. The carrier of claim 1, wherein said containers share a common bottom wall.

3. The carrier of claim 1, wherein said access openings are at opposite ends of said carrier.

4. The carrier of claim 3, wherein said access openings are positioned at an angle of about 45° below horizontal.

5. The carrier of claim 1, wherein the access opening of said water supply compartment includes a pouring spout.

6. A portable carrier for pet food and water comprising:

a) a food supply compartment with an access opening;

b) a water supply compartment with an access opening, said food supply compartment being joined to said water supply compartment;

c) a food serving dish releasably attached to said food supply compartment, said food serving dish including a side wall with first attachment means extending outwardly therefrom, said first attachment means projecting downwardly when said food serving dish is attached; and d) a water serving dish releasably attached to said water supply compartment, said water serving dish including a side wall with second attachment means extending outwardly therefrom, said second attachment means projecting downwardly when said water serving dish is attached to said water supply compartment, said first and second attachment means being joinable to each other to hold said food and water dishes in a side-by-side arrangement during serving of food and water.

7. The carrier of claim 6 wherein said first and second attachment means are each comprised of a male foot and a female foot, the male foot of each dish being insertable into the female foot of the other dish.

8. The carrier of claim 6 wherein said attachment mean project horizontally from the side walls of said dishes when said dishes are in a upright position.

* * * * *